United States Patent [19]

Paik et al.

[11] Patent Number: 5,241,382
[45] Date of Patent: Aug. 31, 1993

[54] DIGITAL HDTV DATA PACKET FORMAT AND RECEIVER THEREFOR

[75] Inventors: Woo H. Paik, Encinitas; Vincent Liu, San Gabriel; Paul Shen; Edward A. Krause, both of San Diego, all of Calif.

[73] Assignee: General Instrument Corporation, Hatboro, Pa.

[21] Appl. No.: 871,996

[22] Filed: Apr. 25, 1992

[51] Int. Cl.⁵ .................. H04N 7/12; H04N 11/04
[52] U.S. Cl. ........................... 358/133; 358/13; 358/135
[58] Field of Search ............ 358/133, 135, 136, 12, 358/13

[56] References Cited

U.S. PATENT DOCUMENTS

| | | | |
|---|---|---|---|
| 5,111,292 | 5/1992 | Kuriacose | 358/142 |
| 5,122,875 | 6/1992 | Raychaudhuri et al. | 358/133 |
| 5,122,876 | 6/1992 | Aoki | 358/133 |
| 5,134,475 | 7/1992 | Johnston et al. | 358/136 |
| 5,148,272 | 9/1992 | Acampora et al. | 358/135 |
| 5,157,491 | 10/1992 | Kassatly | 358/146 |

Primary Examiner—John K. Peng
Attorney, Agent, or Firm—Barry R. Lipsitz

[57] ABSTRACT

A macroblock packet format is provided for use in a digital HDTV system wherein successive video frames are divided into a plurality of macroblocks. The macroblocks comprise a plurality of superblocks, each containing a plurality of luminance and chrominance video data blocks. A DLEN field is provided in the macroblock packet format to identify the length of the macroblock packet. The packets also include variable length encoded portions of video data. The macroblock packets are transmitted in a data multiplex that also includes a next macroblock position (NMP) word. A receiver compares the DLEN information with the NMP word to verify synchronization, and reacquires the signal if synchronization has been lost.

31 Claims, 4 Drawing Sheets

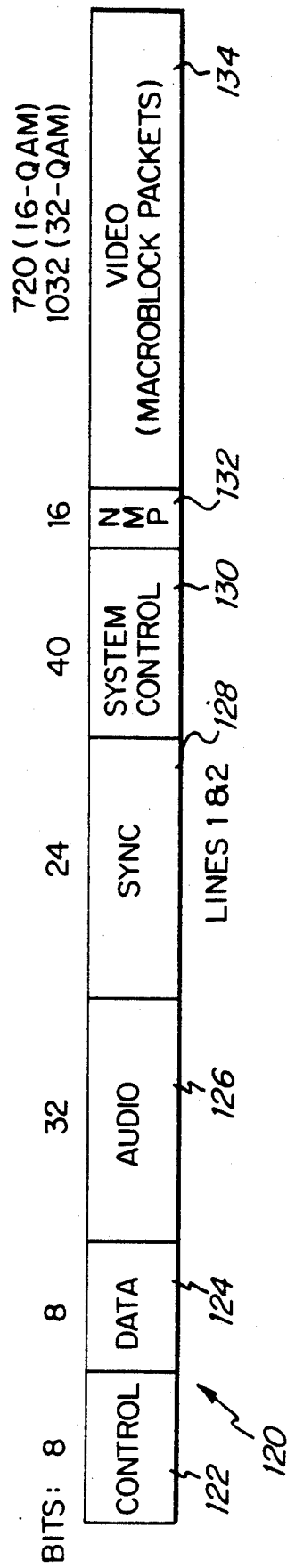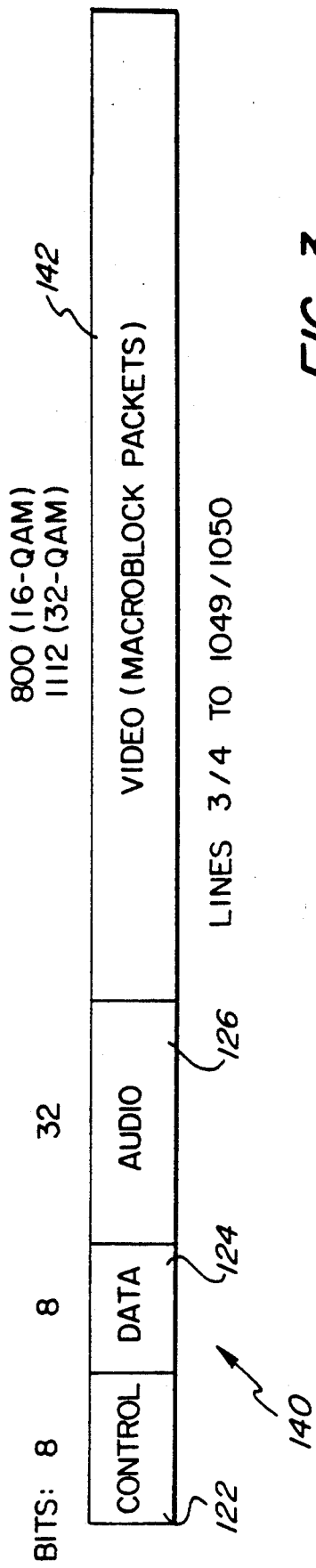

DIGITAL HDTV DATA PACKET FORMAT AND RECEIVER THEREFOR

BACKGROUND OF THE INVENTION

The present invention relates to the communication of digital high definition television (HDTV) data, and more particularly to a data packet format for communicating HDTV data and a receiver for receiving such data.

Television signals are conventionally transmitted in analog form according to various standards adopted by particular countries. For example, the United States has adopted the standards of the National Television System Committee ("NTSC"). Most European countries have adopted either PAL (Phase Alternating Line) or SECAM (sequential color and memory) standards.

Digital transmission of television signals can deliver video and audio services of much higher quality than analog techniques. Digital transmission schemes are particularly advantageous for signals that are broadcast by satellite to cable television affiliates and/or directly to home satellite television receivers. It is expected that digital television transmitter and receiver systems will replace existing analog systems just as digital compact discs have largely replaced analog phonograph records in the audio industry.

A substantial amount of digital data must be transmitted in any digital television system. This is particularly true where high definition television is provided. In a digital television system, a subscriber receives the digital data stream via a receiver/descrambler that provides video, audio, and data to the subscriber. In order to most efficiently use the available radio frequency spectrum, it is advantageous to compress the digital television signals to minimize the amount of data that must be transmitted.

The video portion of a television signal comprises a sequence of video "frames" that together provide a moving picture. In digital television systems, each line of a video frame is defined by a sequence of digital data referred to as "pixels." A large amount of data is required to define each video frame of a television signal. For example, 7.4 megabits of data is required to provide one video frame at NTSC resolution. This assumes a 640 pixel by 480 line display is used with 8 bits of intensity value for each of the primary colors red, green and blue. High definition television requires substantially more data to provide each video frame. In order to manage this amount of data, particularly for HDTV applications, the data must be compressed.

Video compression techniques enable the efficient transmission of digital video signals over conventional communication channels. Such techniques use compression algorithms that take advantage of the correlation among adjacent pixels in order to derive a more efficient representation of the important information in a video signal. The most powerful compression systems not only take advantage of spatial correlation, but can also utilize similarities among adjacent frames to further compact the data. In such systems, differential encoding (DPCM) is used to transmit only the difference between an actual frame and a prediction of the actual frame. The prediction is based on information derived from a previous frame of the same video sequence. Examples of such systems can be found in U.S. Pat. Nos. 5,068,724 entitled "Adaptive Motion Compensation for Digital Television" and 5,057,916 entitled "Method and Apparatus for Refreshing Motion Compensated Sequential Video Images," both incorporated herein by reference.

In the system disclosed in the '724 patent, video signals are processed with motion compensation (DPCM) and without motion compensation (PCM), and a comparison is made to determine which type of processing results in the least amount of data for transmission. U.S. Pat. No. 5,091,782 entitled "Apparatus and Method for Adaptively Compressing Successive Blocks of Digital Video" and incorporated herein by reference, discloses a system wherein video signals are provided in both a frame format and a field format for processing with motion compensation. The resultant signals are compared on a block-by-block basis to determine which format yields the fewest errors.

Motion estimation of a video signal is provided by comparing the current luminance block with the luminance blocks in the previous frame within a specified tracking range. The previous frame luminance block with the minimum total absolute change compared to the current block is chosen. The position of the chosen block is called the motion vector, which is used to obtain the predicted values of the current block. For additional coding efficiency, the motion vectors can be differentially encoded and processed by a variable length encoder for transmission as side information to a decoder. A low pass filter may be provided in the DPCM loop for the purpose of smoothing out the predicted values as necessary. In order to protect the coded bitstream from various kinds of random noise, a forward error correction (FEC) scheme can be used.

One category of coding schemes for compressing the data rate by removing redundant information is known as "entropy coding." Another category, which relies on a human visual model (i.e., perception) yields results that can be lossy. Thus, picture quality can be degraded when the latter is used. In implementing such techniques, either intraframe or interframe coding can be used. Intraframe coding is used for the first picture and for later pictures after a change of scene. Interframe coding is used for sequences of pictures containing moving objects. Entropy coding achieves compression by using the statistical properties of the signals and is, in theory, lossless.

A coding algorithm that uses such coding techniques has been proposed by the CCITT Specialist Group. See, e.g., "Description of Reference Model 8 (RM8)," Doc. No. 525, CCITT SG XV Working Party XV-4, Specialist Group on Coding for Visual Telephony, June, 1989. In the CCITT scheme, a hybrid transform-/differential pulse coded modulation (DPCM) with motion estimation is used. The DPCM is not operative for intraframe coding. For entropy coding, both one- and two-dimensional variable length codings are used.

The discrete cosine transform (DCT) described by N. Ahmed, T. Natarajan, and K. R. Rao, "Discrete Cosine Transform," *IEEE Trans. Computer*, Vol. C-23, pp. 90–93, Jan. 1974, is used in the CCITT system to convert the input data, which is divided into macroblocks and sub-blocks, into transform coefficients. The DCT transform is performed on the difference between blocks of current frame data and corresponding blocks of a predicted frame (which is obtained from the previous frame information). If a video block contains no motion or the predicted value is exact, the input to the DCT will be a null matrix. For slowly moving pictures, the input matrix to the DCT will contain many zeros.

The output of the DCT is a matrix of coefficients which represent energy in the two-dimensional frequency domain. In general, most of the energy is concentrated at the upper left corner of the matrix, which is the low frequency region. If the coefficients are scanned in a zigzag manner, the resultant sequence will contain long strings of zeros, especially toward the end of the sequence. One of the major objectives of this compression algorithm is to create zeros and to bunch them together for efficient coding.

To maintain efficiency, a variable threshold is also applied to the coefficient sequence before quantization. This is accomplished by increasing the DCT threshold when a string of zeros is detected. A DCT coefficient is set to zero if it is less than or equal to the threshold.

A uniform quantizer is used after the transform. The step size of the quantizer can be adjusted by the transmission rate as indicated by the occupancy of a buffer. When the transmission rate reaches its limit, the step size will be increased so that less information needs to be coded. When this occurs, a degraded picture will result. On the other hand, picture quality will be improved by decreasing the step size when the transmission rate is below its limit.

To further increase coding efficiency, a two-dimensional variable length coding scheme is used for the sequences of quantized DCT coefficients. In a given sequence, the value of a non-zero coefficient (amplitude) is defined as one dimension and the number of zeros preceding the non-zero coefficient (runlength) is defined as another dimension. The combination of amplitude and runlength is defined as an "event."

A shorter length code is assigned to an event which occurs more frequently. Conversely, infrequent events receive longer length codes. An EOB (end of block) marker is provided to indicate that there are no more non-zero coefficients in the sequence.

The coded coefficient values are multiplexed together with various side information such as block classification, quantization information, and differential motion vectors. Some of the side information may also be variable length coded. The resultant bitstream is sent to a buffer for transmission.

At a receiver, a variable length decoder is necessary to perform the inverse operation of the encoder and recover the transform coefficients. In order to increase the efficiency of the receiver, it is desirable to transmit the variable length coded data in a format that provides useful information to the receiver. For example, it would be advantageous to provide a data format that includes various data fields that enable the receiver to avoid unnecessary processing. It would also be advantageous to indicate to the receiver whether a data packet currently being received has been encoded as DPCM data or PCM data. If the data has been encoded as PCM data (i.e., without motion compensation), then the receiver could be instructed to skip over any processing relating to motion compensation. Similarly, where a received packet does not contain video data, the receiver could be instructed to bypass the decoding routines that relate to the processing of video data. It would be still further advantageous for the transmitted data format to provide a field that indicates the length of a received data packet. Such information would be useful to prevent a loss of synchronization in the event of a transmission error. Other information useful to the receiver can also be advantageously provided in transmitted data packets.

The present invention provides a data packet format for use in a digital HDTV system, as well as a receiver for such packets, all having the aforementioned advantages.

SUMMARY OF THE INVENTION

In accordance with the present invention, a macroblock packet format is provided for use in a digital HDTV system. In the HDTV system, successive video frames are each divided into a plurality of macroblocks which, in turn, comprise a plurality of superblocks. The superblocks contain a plurality of luminance and chrominance video data blocks. The macroblocks are processed into variable length macroblock packets for transmission, using various known compression techniques such as motion compensation, quantization, and variable length encoding. The macroblock packet format comprises a DLEN field identifying the length of the macroblock packet, and a compressed, variable length encoded portion of video data.

The macroblock packet format can further comprise an MPCM field identifying whether the entire macroblock packet has been encoded in PCM mode (i.e., without motion compensation). In the event that the entire macroblock packet has not been encoded in PCM mode, at least one additional -PCM field is provided for distinguishing between portions of superblocks that comprise PCM encoded data and portions of superblocks that comprise DPCM encoded data (i.e., with motion compensation).

A first additional -PCM field that can be provided in the macroblock packet is an SPCM field. This field specifies whether all of the blocks of video data in a particular superblock comprise PCM encoded data, or all of the blocks of video data in the particular superblock comprise DPCM encoded data, or one luminance block of video data in the particular superblock comprises PCM encoded data and the rest of the blocks comprise DPCM encoded data, or PCM and DPCM encoded blocks of video data occur arbitrarily in the particular superblock. In the case where data has been encoded using motion compensation, a motion vector field is provided that contains motion vector data corresponding to the DPCM encoded data.

A second additional -PCM field is an LPCM field that is used when one luminance block in a superblock is PCM encoded and all other video data blocks in the superblock are DPCM encoded. The LPCM field identifies the PCM encoded luminance block.

An alternative additional -PCM field is a DPCM field that is used when PCM and DPCM encoded blocks of video data occur arbitrarily in a superblock. The DPCM field identifies which of the blocks of video data in the superblock are PCM encoded and which are DPCM encoded.

The macroblock packet format can further comprise a QL field for indicating a global quantization level of the superblocks. A DQL field can be provided to indicate a quantization level of superblocks that do not use the global quantization level. A VQL field is provided for indicating a correction factor to be applied to the global quantization level.

An FID field is provided for indicating if a macroblock packet is the first macroblock packet in a new video frame. When a receiver detects the occurrence of a new video frame from the FID field, it will jump to a special subroutine for processing additional fields that specifically relate to the occurrence of the new video frame. For example, a FILM field is provided to indicate, during the first macroblock packet in a new video frame, whether data in the new video frame is provided in a video mode or a film mode. A BFM field is provided for indicating, during the first macroblock packet in a new video frame, a frame number for the new video frame.

In an illustrated embodiment, successive video frames are divided into a plurality of subframes, each subframe containing a subset of the plurality of macroblocks. A CID field is provided in the macroblock packet format to indicate the subframe with which a current macroblock packet is associated.

The illustrated embodiment also contemplates the processing of the superblocks in one of a frame mode and a field mode. An FLD field is provided in the macroblock packet format to indicate in which of the frame mode and field mode each of the superblocks has been processed.

Receiver apparatus in accordance with the present invention decodes variable length digital HDTV macroblock packets representative of macroblock portions of successive video frames. The macroblock portions comprise a plurality of superblocks. The superblocks contain a plurality of luminance and chrominance video data blocks. Means are provided for detecting a DLEN field in a received macroblock packet. The DLEN field identifies the length of the macroblock packet. Means responsive to a detected DLEN field maintain a plurality of received macroblock packets in synchronization for the recovery of video data therefrom.

In a preferred embodiment, the receiver apparatus further comprises means for detecting an MPCM field in a received macroblock packet. The MPCM field identifies whether the entire macroblock packet has been encoded in PCM mode. Means responsive to a detected MPCM field detect at least one additional -PCM field in the event that the entire macroblock packet has not been encoded in PCM mode. The at least one additional -PCM field comprises an SPCM field to indicate which of PCM encoded data and DPCM encoded data are included in the video data blocks of a superblock.

The means for detecting at least one additional -PCM field can further detect one of an LPCM and a BPCM field for each superblock having both PCM and DPCM data. The LPCM field is present when one luminance block in the superblock is PCM encoded and all other video data blocks in the superblock are DPCM encoded. The LPCM field identifies the PCM encoded luminance block. The BPCM field is present when PCM and DPCM encoded blocks of video data occur arbitrarily in a superblock. The BPCM field identifies which of the blocks of video data in the superblock are PCM encoded and which are DPCM encoded. The receiver apparatus further comprises means for detecting a motion vector field in a received macroblock packet containing motion vector data corresponding to DPCM encoded blocks of video data.

The receiver apparatus can further comprise means for detecting an FID field in a received macroblock packet for indicating if the macroblock packet is the first macroblock packet in a new video frame. Means responsive to a detected FID field detect a FILM field in a received macroblock packet. The FILM field indicates, during the first macroblock packet in a new video frame, whether data in the new video frame is provided in a video mode or a film mode. Means are also provided that are responsive to a detected FID field for detecting a DFM field in a received macroblock packet. The DFM field indicates, during the first macroblock packet in a new video frame, a frame number for the new video frame.

Memory means can be provided for storing a film/video mode flag derived from the FILM field. Means responsive to an indication by the film/video mode flag that a video frame in which the macroblock packet resides contains data in a video mode, detect an FLD field in a received macroblock packet. The FLD field indicates in which of a frame mode and a field mode each of the superblocks corresponding to the received macroblock packet has been processed. Means responsive to a detected FID field proceed to receive a next successive macroblock packet after the detection of the film and DFM fields.

The receiver apparatus can further comprise means for detecting a QL field in a received macroblock packet that indicates a global quantization level of the superblocks. Means responsive to a detected QL field proceed to receive a next successive macroblock packet when the QL field indicates a global quantization level that exceeds a predetermined value. Means are also provided for detecting a DQL field in a received macroblock packet. The DQL field indicates a quantization level of superblocks that do not use the global quantization level. Means responsive to a detected DQL field detect a VQL field in a received macroblock. The VQL field indicates a correction factor to be applied to the global quantization level when the DQL field indicates that the quantization level used for one or more superblocks of the current macroblock packet differ from the global quantization level.

In a preferred embodiment, the successive video frames are divided into a plurality of subframes. Each subframe contains a plurality of macroblock portions. The receiver apparatus comprises means for detecting a CID field in a received macroblock packet. The CID field indicates the subframe with which the macroblock packet is associated.

As indicated above, the receiver apparatus includes means responsive to a detected DLEN field for maintaining a plurality of received macroblock packets in synchronization for the recovery of video data therefrom. In a preferred embodiment, the macroblock packets received by the receiver are contained in video portions of successive lines of HDTV data. These lines contain additional data, that is also received and used by the receiver. At least one such line in each new video frame includes a next macroblock position (NMP) word that indicates the beginning position of the next macroblock in the following video data portion of the line. Means are provided for recovering the NMP word, and comparing it to DLEN data recovered by the receiver to determine if they both point to the same position in the received data stream. If they do not point to the same position, an error has occurred and the signal is reacquired to provide proper synchronization.

BRIEF DESCRIPTION OF THE DRAWINGS

FIG. 2 is a diagrammatic illustration of a data multiplex format used in lines 1 and 2 of an HDTV video frame;

FIG. 3 is a diagrammatic illustration of a data multiplex format used in odd lines 3 to 1049 and even lines 4 to 1050 of an HDTV video frame;

DETAILED DESCRIPTION OF THE INVENTION

Figure 1:
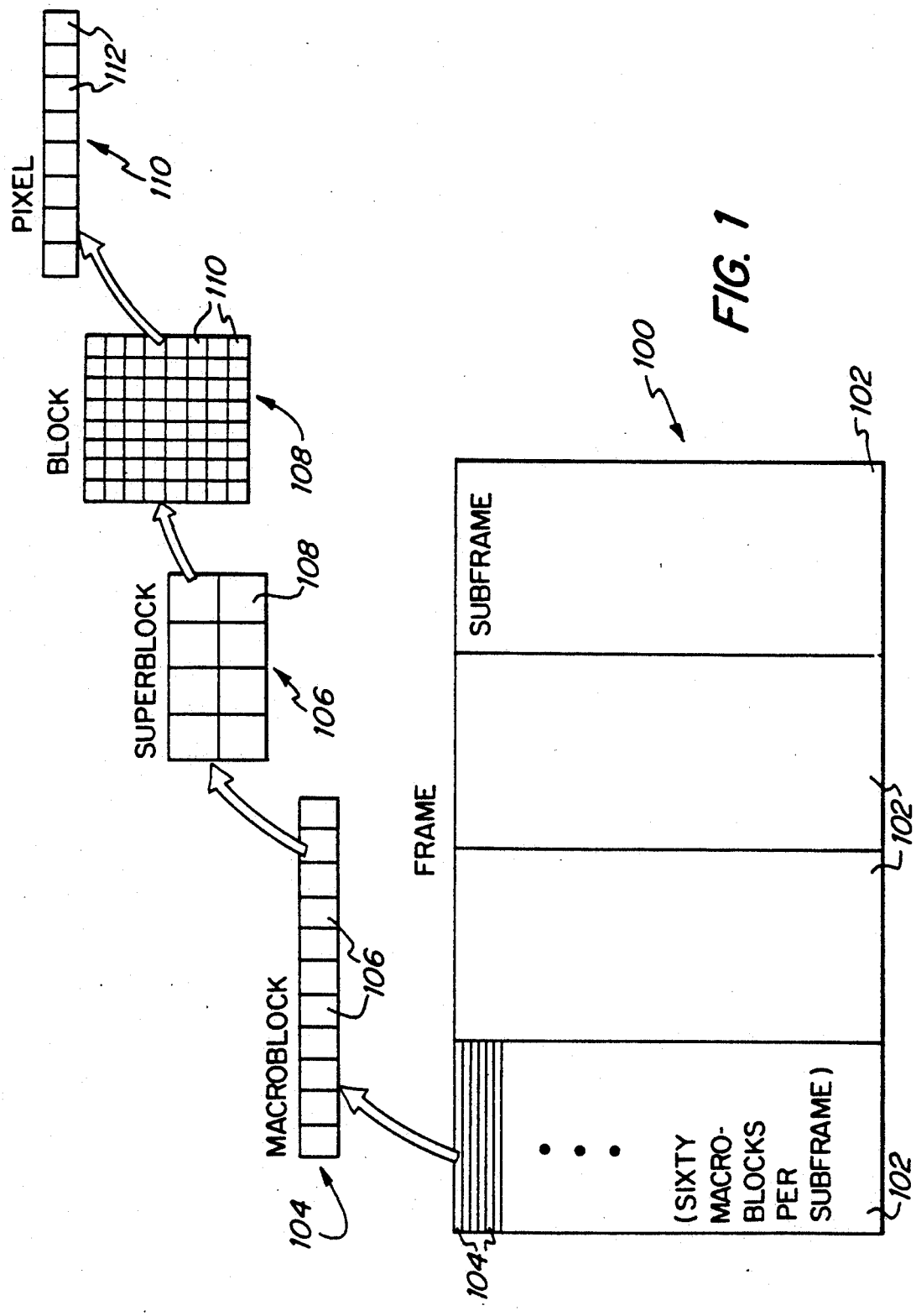
FIG. 1 is a diagrammatic illustration showing how a video frame is subdivided into subframes, macroblocks, superblocks, and blocks containing eight bit bytes of pixel data.

In the communication of digital HDTV signals, a video frame is divided into various subcomponents so that the picture represented by the frame can be processed as a plurality of smaller portions thereof. FIG. 1 illustrates one way to divide a picture frame for processing in accordance with the present invention. A full frame 100, representing a "snapshot" of a continuous television picture, is divided into four vertical subframes 102. Each subframe contains sixty macroblocks 104, which extend horizontally across the subframe and are stacked in the vertical direction. A macroblock 104 is an image area of the picture that comprises eleven superblocks 106 that are positioned side-by-side horizontally. Each superblock 106 comprises an image area that covers four luminance blocks 108 in the horizontal direction and two luminance blocks 108 in the vertical direction. Each superblock is associated with one chrominance block (not shown) each for U and V derived from that image area. Each luminance or chrominance block 108 comprises an 8×8 matrix of pixels 110. Each pixel comprises an eight bit active video sample (luminance or chrominance). The individual pixel bits 112 form an eight bit pixel word 110.

The representation of an image by digitized samples is generally referred to as PCM coding. PCM coding is also known as "intraframe" coding. In intraframe coding, each video frame is coded independently, without reference to any other video frame. In "interframe" coding, also known as DPCM coding, a frame being coded is compared to one or more other frames to derive a difference signal. Such techniques are used, for example, in systems that provide coding using motion compensation.

In order to transmit HDTV signals from a transmitter to one or more receivers, various data other than the video data must be transmitted. For example, control data, textual data, audio data, synchronization data, and other information necessary to the recovery of the video and audio information must be communicated. In a system in accordance with the present invention, a multiplex format as shown in FIGS. 2 and 3 can be used to communicate all of the various HDTV information to a receiver. FIG. 2 illustrates the data multiplex format 120 for lines 1 and 2 of each new video frame. FIG. 3 illustrates the data multiplex format 140 for each of odd lines 3 to 1049 and even lines 4 to 1050 of each video frame.

Referring first to the data multiplex format of FIG. 2, a control word 122 is used for subscriber addressing and is sent at the beginning of each line. In the illustrated embodiment, control word 122 consists of four bits per line (i.e., eight bits per two-line time) which corresponds to a data rate of 125.87 kbps. A data word 124 also consists of four bits per line (eight bits per two-line time) and is used for sending auxiliary data. The 125.87 kbps data rate provides sufficient capacity for up to thirteen 9600 baud data streams. Audio data 126 is transmitted using 32 bits per line (i.e., 64 bits per line pair). This provides a data rate of 1.01 Mbs for each of a plurality of audio channels.

During lines 1 and 2 of each video frame, a 24 bit sync sequence 128 is transmitted for maintaining overall synchronization. A system control word 130 and next macroblock position (NMP) word 132 are also contained in the data multiplex format 120 for lines 1 and 2 of each video frame. The system control word contains a 24 bit control word and a 16 bit frame count, for a total of 40 bits. The NMP word is a 16 bit word that indicates the beginning position of the next macroblock within the following video block 134. The NMP word is used in effecting the initial video acquisition and is also used, in combination with a DLEN signal described below, to recover from an overall loss of synchronization. The end of the data multiplex format 120 for lines 1 and 2 of each video frame contains actual video information 134, comprising a plurality of macroblock packets that are formatted in accordance with the present invention. When the data is communicated using 16-QAM (quadrature amplitude modulation), 720 bits of video information will be included in the data multiplex format for lines 1 and 2 of each video frame. Where 32 QAM is used, 1032 bits of video information are provided for each of lines 1 and 2. Thus, multiplex format 120 will contain a total of either 848 bits or 1160 bits prior to forward error coding, depending on the QAM mode.

The multiplex format 140 for odd lines 3 to 1049 and even lines 4 to 1050 contains the control word 122, data word 124, and audio data 126 as in multiplex format 120. Multiplex format 140 does not include sync, system control, or NMP information. Instead, it carries a larger amount of video data 142 in the form of macroblock packets in accordance with the present invention. For 16-QAM communication, multiplex format 140 carries 800 bits of video information. For 32-QAM format, format 140 carries 1112 bits of video information. Thus, depending on the QAM mode, the data multiplex for each of lines 3 to 1050 will carry a total of 848 bits or 1160 bits, prior to forward error correction, depending on the QAM transmission mode.

The video information for each of the lines of a video frame is transmitted as a sequence of macroblock packets. These macroblock packets are variable in length and therefore cannot be aligned with the boundaries of the video portions 134, 142 illustrated in FIGS. 2 and 3, respectively. Therefore, the macroblock packets are transmitted asynchronously with the beginning of one macroblock packet occurring immediately after the end of the previous one. A macroblock packet is continued during the video portion of the next line if it is too large to fit within the remaining space of the current video portion. At the decoder, synchronization is achieved through the use of the NMP word 132 that is communicated in lines 1 and 2 in each video frame.

Figure 4:
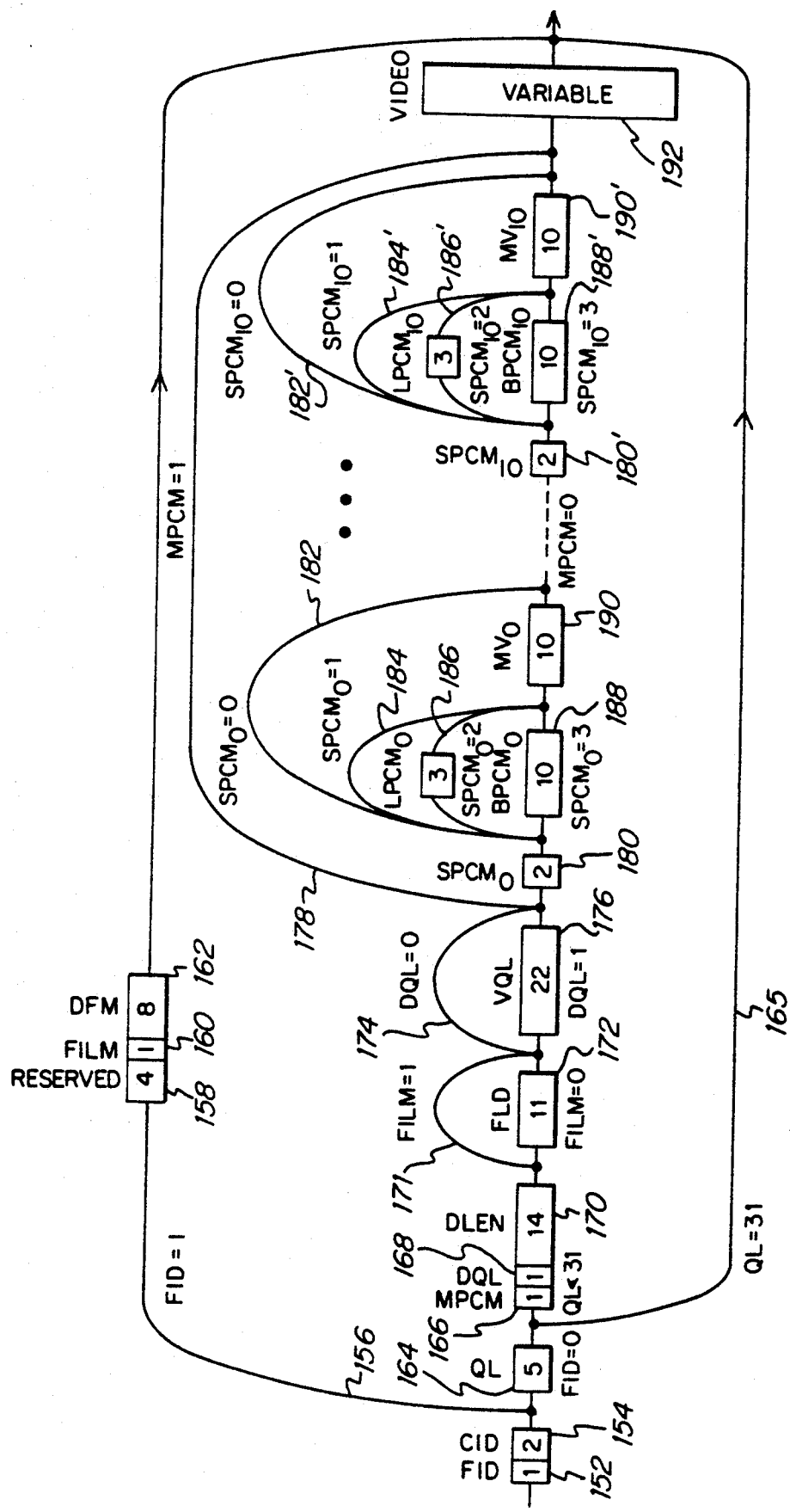
FIG. 4 is a diagrammatic illustration showing the format of a macroblock packet in accordance with the present invention.

The macroblock packet format is illustrated in FIG. 4. Video overhead is inserted at the beginning of each macroblock. As indicated above in connection with FIG. 1, a macroblock contains 11 superblocks and comprises one row of an image subframe. However, the first macroblock of each subframe is an exception, in which no video data is transmitted. The first macroblock of each subframe is used to identify whether the macroblock is the first in a new frame, to specify which of the four subframes the macroblock is associated with, and to provide information identifying whether the macroblock is in a film mode format or video mode format, together with frame count information for use during film mode.

The macroblock packet format contains various fields. Some of the fields are dependent on the type of coding used for the information contained in the packet. Therefore, different packets may contain different fields. All of the fields are illustrated in FIG. 4, with jumps to indicate the conditions under which certain fields are eliminated. The various fields are defined as follows:

FID The frame ID bit sent at the beginning of each macroblock. FID is 1 if the macroblock is the first in a new frame and 0 otherwise.

CID Channel ID bit specifying which of the four subframes is to be associated with the current macroblock.

FILM Sent during the first macroblock of a new frame. FILM is 1 when 24 frame/sec. film mode is used and the three-two pulldown process is required for display at the decoder. FILM is 0 when in video mode.

DFM Frame count sent during the first macroblock of a new frame and used primarily to identify the three-two pulldown phase when in film mode. The transmitted frames are counted sequentially whether in film mode or video mode.

QL Global quantization level ranging from 0 to 31. It is required for inverse normalization of the transmitted/received DCT coefficients.

MPCM When set to 1, indicates that the entire macroblock has been encoded in PCM mode. Subsequently, all of the SPCM, LPCM, BPCM and MV fields described below are omitted.

DQL When set to 1, indicates the presence of superblocks that do not use the global quantization level (QL).

DLEN The length of the macroblock. This is to prevent a loss of synchronization in the event of a transmission error.

FLD Includes one bit for each of the 11 superblocks within the macroblock. Each bit indicates whether the corresponding superblock has been processed in frame mode (FLD is 0) or field mode (FLD is 1).

VQL Includes two bits for each of the eleven superblocks within the macroblock. Each pair indicates a correction factor to be applied to the global quantization level (QL).

SPCM Includes two bits for each of the eleven superblocks Within the macroblock. It is used to specify the mode of PCM/DPCM overhead encoding for the eight luminance blocks and two chrominance blocks within each superblock. SPCM may have one of four values:
0 All blocks are PCM.
1 All blocks are DPCM.
2 One luminance block is PCM. All other blocks are DPCM.
3 PCM and DPCM blocks occur arbitrarily within the superblock.

LPCM LPCM is sent when a single luminance block within the ith superblock is PCM (SPCM is 2). It is a three bit number indicating the location of the PCM block.

BPCM BPCM is sent when PCM and DPCM blocks occur arbitrarily Within the ith superblock (SPCM is 3). It uses ten bits to specify the PCM/DPCM decision for the eight luminance blocks and the two chrominance blocks.

MV A ten bit motion vector that is sent for each superblock containing at least one DPCM block.

VIDEO Compressed video data.

Referring to the above list in conjunction with FIG. 4, it can be seen that a particular macroblock packet will include different fields depending on the coding of the video information. In the illustrated embodiment, each packet commences with the FID field 152. The number within the box indicates the number of bits within the field. The CID field 154 is then provided. If FID field 152 indicated that this was the first macroblock packet in a new frame, the macroblock packet format will proceed along path 156 and the next field provided is a four bit "reserved" field 158. This field merely provides filler bits, so that the macroblock packet will always end on an eight bit byte boundary. It is noted that the sum of fields 152, 154, 158, 160, and 162, which is the path taken when the macroblock packet is the first in a new frame, totals sixteen bits, which is a multiple of eight. Following the reserved field 158, comes FILM field 160 and DFM field 162. This completes the format for the first macroblock packet of each new video frame.

For macroblock packets other than the first in a video frame, the QL field 164 follows CID field 154. In the event that no video data is to be sent in the current macroblock packet, for example if the video buffer is filling up and there is a concern that it could overflow if additional video data were loaded into it, the quantization level is set to 31 and no further fields are provided in the current macroblock packet. This is indicated by path 165 in FIG. 4.

If the quantization level is less than 31, the next field in the macroblock packet will be MPCM field 166. This is followed by DQL field 168 and the DLEN field 170. The DLEN field is followed by the FLD field 172, unless the superblock corresponding to the current macroblock packet is formatted in a film mode, in which case path 171 is taken and no FLD field is provided. If the macroblock packet corresponds to a macroblock containing superblocks that do not all use the global quantization level, as indicated by the DQL field 168 being set to 1, VQL field 176 is next provided. However, if all of the superblocks use the global quantization level, DQL will be set to zero and path 174 will be followed, in which case no VQL field is provided.

The remaining fields (prior to the variable length video data 192 in the macroblock packet) relate to the provision of DPCM coding. In the event that there is no DPCM coded data in the entire macroblock, the MPCM field 166 will have been set to 1, and path 178 will be followed so that no additional fields are provided between VQL field 176 and the video data field 192. However, if the MPCM field is set to zero, indicating that at least some of the macroblock data has been encoded in DPCM mode, a first SPCM field 180 will be provided for the first superblock within the macroblock. This is a two bit field, that specifies the mode of PCM/DPCM overhead encoding for each of the luminance and chrominance blocks within the superblock. If the SPCM field is set to 0, indicating that all blocks in the superblock are PCM coded, path 182 is followed and no additional fields are provided for that superblock in the macroblock packet. If SPCM is set to 1, indicating that all of the blocks in the superblock are DPCM coded, path 184 is followed and a motion vector field 190 is provided containing the motion vector information for the superblock. If the SPCM field is set to 2, indicating that one luminance block is PCM coded and all other blocks within the superblock are DPCM coded, an LPCM field 186 is provided. This identifies the location of the single PCM block within the superblock. The motion vector field 190 is also provided to enable decoding of the remaining DPCM coded data. In the event that the SPCM field is set to 3, indicating that PCM and DPCM blocks occur arbitrarily within the superblock, a BPCM field 188 is provided to specify the PCM/DPCM status of each of the luminance and chrominance blocks in the superblock. Again, the motion vector field 190 is provided to enable the decoding of the DPCM encoded data.

Following the macroblock packet fields for the first superblock, are similar fields for the remaining superblocks within the current macroblock. One set of fields for a subsequent superblock is illustrated in FIG. 4. These are fields 180', 186', 188', and 190', and paths 182', and 184'.

After all of the fields for each superblock within the current macroblock have been provided, the macroblock packet format is concluded with the video field 192. Those skilled in the art will appreciate that various of the fields indicated in FIG. 4 can be provided in a different order, and that the scope of the present invention is not limited to the specific field order illustrated.

There is always a possibility that a transmission error will occur that could cause one or more bits in a macroblock packet to be dropped. In order to recover from such an error, macroblock packets in accordance with the present invention include the DLEN field 170 that indicates the length of the macroblock packet. The communications receiver that receives the macroblock packets will check the NMP word 132 provided prior to the video information in lines 1 and 2 of each new video frame (FIG. 2) against the macroblock packet length provided in the DLEN field of each macroblock packet. If the NMP word and DLEN field do not point to the same position in the incoming data for the end of the current macroblock and start of the next macroblock, the receiver will assume that the NMP word is correct and reacquire the signal so that the error will not propagate. As a secondary precaution, the receiver will keep track of the value of the FID field 152 in each of the macroblock packets for each video frame. There should be only one FID field that is set to 1 for each video frame. If more than one such FID field is detected, an error has obviously occurred and the receiver will reacquire the signal.

Figure 5:
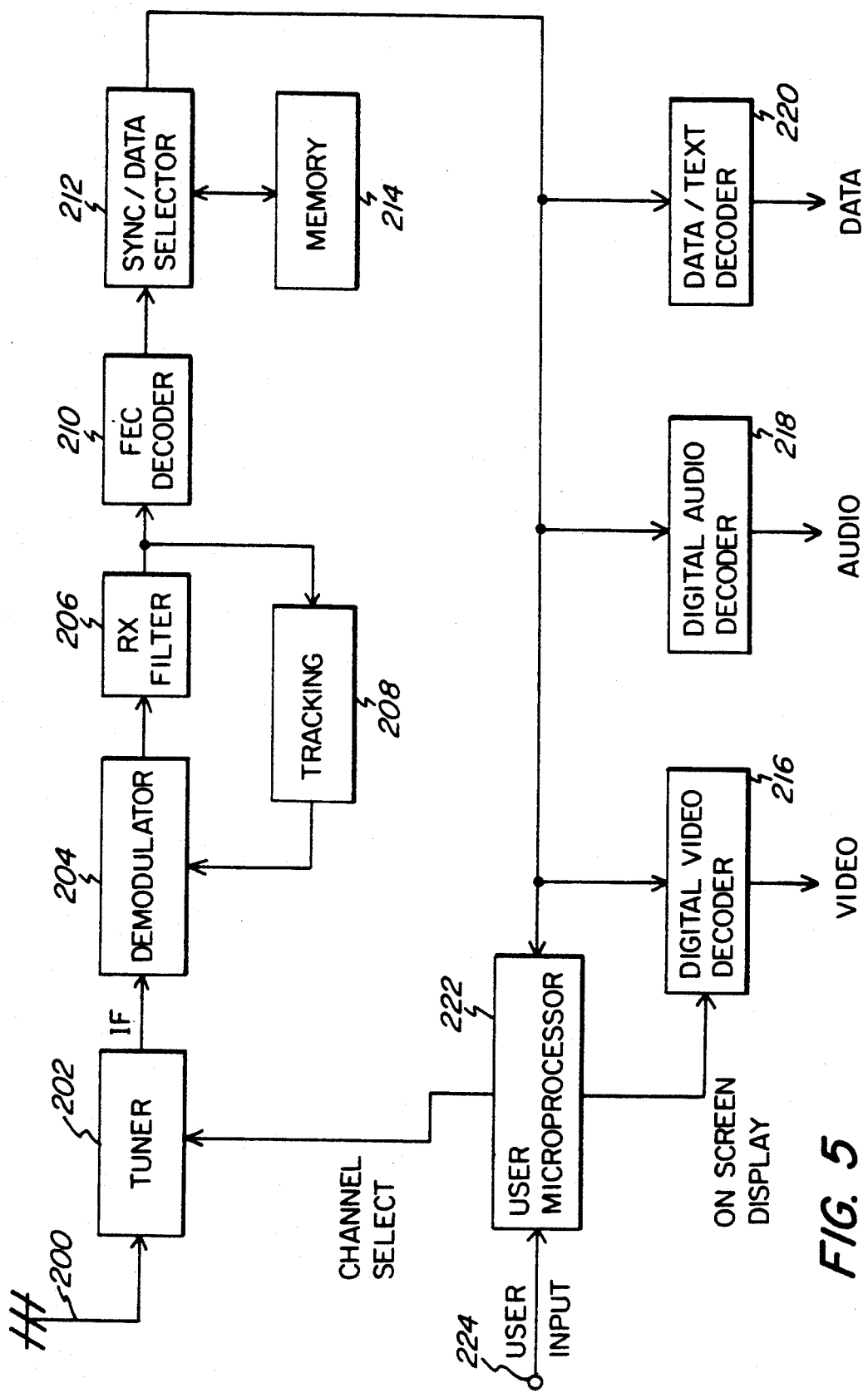
FIG. 5 is a block diagram of receiver apparatus in accordance with the present invention.

FIG. 5 illustrates a receiver for use in connection with the present invention. The signals are received via an antenna 200 (or other source such as a cable) and input to a conventional radio frequency (RF) tuner 202. Channels are selected by a television viewer via a keyboard or remote control that interfaces with a user microprocessor 222 via a user input terminal 224. The user microprocessor 222 outputs a channel select signal to tuner 202. The tuned signal is output to a demodulator 204 at an intermediate frequency (IF) in accordance with well known techniques. The demodulator demodulates the received signal, which is typically communicated using QAM. The demodulated signal is filtered in a filter 206, and applied to a tracking circuit 208 for feedback to the demodulator in a conventional manner. Multi-path distortions common in terrestrial transmission are combatted at the demodulator 204 by an adaptive equalizer contained within the demodulator.

A forward error correction (FEC) decoder 210 receives the filtered, demodulated channel signal and corrects for random or burst errors in the received signal providing substantially error-free data to a synchronization/data selector 212. The sync/data selector 212 maintains overall synchronization and provides video, audio, data/text, and control data streams to appropriate processing blocks in the receiver. A memory 214 stores firmware for the operation of sync/data selector 212 as well as various information recovered from the multiplexed data stream illustrated in FIGS. 2 and 3. For example, memory 214 will store the NMP word 132 for checking against the DLEN field of each successive macroblock packet to verify that the received signal is in proper synchronization. Sync/data selector 212 also recovers the sync word 128 from lines 1 and 2 of each new video frame to provide receiver synchronization.

The received macroblock packets are communicated by sync/data detector 212 to a digital video decoder 216 for decoding and output of the video information. On-screen display data generated by user microprocessor 222 is also input to the digital video decoder for output to a user's video display. A digital audio decoder 218 receives the audio data 126 from the sync/data selector for decoding and output of the audio signals. A data/text decoder 220 can also be provided to receive and decode other data or text information for output to a computer or an appropriate display.

It will now be appreciated that the present invention provides a macroblock packet format for use in a digital HDTV system, as well as receiver apparatus for receiving and decoding HDTV signals that carry video information in the macroblock packet format. Various fields are provided in the macroblock packet format to enable the receiver to properly recover and decode the video information. The macroblock packets are transmitted as part of a data multiplex signal format that also includes audio data, control data, synchronization information, and optional text or auxiliary data.

Those skilled in the art will appreciate that although the invention has been described in connection with a specific embodiment thereof, various adaptations and modifications may be made thereto without departing from the spirit and scope of the invention as set forth in the claims.

What is claimed is:

1. A method for communicating HDTV signals wherein successive video frames are each divided into a plurality of macroblocks, said macroblocks comprise a plurality of superblocks, said superblocks contain a plurality of luminance and chrominance video data blocks, and wherein at least a portion of said macroblocks are communicated in variable length macroblock packets having a format that includes a plurality of fields, comprising the steps of:
   providing a DLEN field in said format to identify the length of the macroblock packet; and
   providing a compressed, variable length encoded portion of video data in said format.

2. A method in accordance with claim 1 comprising the further steps of:
   providing an MPCM field in said format to identify whether the entire macroblock packet has been encoded in PCM mode; and
   in the event that the entire macroblock packet has not been encoded in PCM mode, providing at least one additional —PCM field for distinguishing between portions of superblocks that comprise PCM encoded data and portions of superblocks that comprise DPCM encoded data.

3. A method in accordance with claim 2 comprising the further step of:
   providing a motion vector field in said format containing motion vector data corresponding to said DPCM encoded data.

4. A method in accordance with claim 2 wherein:
   a first additional -PCM field is an SPCM field that specifies whether:
   all of the blocks of video data in a particular superblock comprise PCM encoded data, or
   all of the blocks of video data in said particular superblock comprise DPCM encoded data, or
   one luminance block of video data in said particular superblock comprises PCM encoded data and the rest of the blocks therein comprise DPCM encoded data, or
   PCM and DPCM encoded blocks of video data occur arbitrarily in said particular superblock.

5. A method in accordance with claim 4 wherein:
   a second additional -PCM field is an LPCM field that is used when one luminance block in a superblock is PCM encoded and all other video data blocks in said superblock are DPCM encoded, and that identifies the PCM encoded luminance block.

6. A method in accordance with claim 4 wherein:
   a second additional -PCM field is a BPCM field that is used when PCM and DPCM encoded blocks of video data occur arbitrarily in a superblock, and that identifies which of the blocks of video data in the superblock are PCM encoded and which are DPCM encoded.

7. A method in accordance with claim 1 comprising the further step of:
   providing a QL field in said format for indicating a global quantization level of said superblocks.

8. A method in accordance with claim 7 comprising the further step of:
   providing a DQL field in said format for indicating the presence of superblocks that do not use the global quantization level.

9. A method in accordance with claim 8 comprising the further step of:
   providing a VQL field in said format for indicating a correction factor to be applied to said global quantization level.

10. A method in accordance with claim 1 comprising the further step of:
    providing an FID field in said format for indicating if a macroblock packet is the first macroblock packet in a new video frame.

11. A method in accordance with claim 10 comprising the further step of:
    providing a FILM field in said format for indicating, during the first macroblock packet in a new video frame, whether data in the new video frame is provided in a video mode or a film mode.

12. A method in accordance with claim 10 comprising the further step of:
    providing a DFM field in said format for indicating, during the first macroblock packet in a new video frame, a frame number for the new video frame.

13. A method in accordance with claim 1 wherein said successive video frames are divided into a plurality of subframes, each subframe containing a subset of said plurality of macroblocks, said method comprising the further step of:
    providing a CID field in said format for indicating the subframe with which the macroblock packet is associated.

14. A method in accordance with claim 1 wherein said superblocks have been processed in one of a frame mode and a field mode, said method comprising the further step of:
    providing an FLD field in said format that indicates in which of said frame mode and field mode each of said superblocks has been processed.

15. A method in accordance with claim 1 wherein said successive video frames are divided into a plurality of subframes, each subframe containing a subset of said plurality of macroblocks, said method comprising the further steps of providing said format with each of:
    an FID field for indicating if the macroblock packet is the first macroblock packet in a new video frame;
    a FILM field for indicating, during the first macroblock packet in a new video frame, whether data in the new video frame is provided in a video mode or a film mode;
    a DFM field for indicating, during the first macroblock packet in a new video frame, a frame number for the new video frame;
    a CID field that indicates the subframe with which the macroblock packet is associated;
    a QL field for indicating a global quantization level of said superblocks;
    a DQL field for indicating the presence of superblocks that do not use the global quantization level;
    an MPCM field for identifying whether the entire macroblock packet has been encoded in PCM mode;
    an SPCM field indicative of which of PCM encoded data and DPCM encoded data are included in the video data blocks of a corresponding superblock;
    one of an LPCM and a BPCM field for each superblock having both PCM and DPCM data;
    said LPCM field being present when one luminance block in the superblock is PCM encoded and all other video data blocks in said superblock are DPCM encoded, and identifying the PCM encoded luminance block; and
    said BPCM field being present when PCM and DPCM encoded blocks of video data occur arbitrarily in a superblock, and identifying which of the blocks of video data in the superblock are PCM encoded and which are DPCM encoded; and
    a motion vector field containing motion vector data corresponding to DPCM encoded blocks of video data.

16. A method in accordance with claim 15 comprising the further step of:
    providing an FLD field in said format for indicating in which of a frame mode and field mode each of the superblocks corresponding to a macroblock packet has been processed.

17. A method in accordance with claim 16 comprising the further step of:
    providing a VQL field in said format for indicating a correction factor to be applied to said global quantization level, when said DQL field indicates that the quantization level used for one or more superblocks of the current macroblock packet differ from the global quantization level.

18. Receiver apparatus for decoding variable length digital HDTV macroblock packets having a plurality of fields and being representative of macroblock portions of successive video frames, wherein said macroblock portions comprise a plurality of superblocks and said superblocks contain a plurality of luminance and chrominance video data blocks, comprising:

means for detecting a DLEN field in a received macroblock packet, said DLEN field identifying the length of the macroblock packet; and means responsive to a detected DLEN field for maintaining a plurality of received macroblock packets in synchronization for the recovery of video data therefrom.

19. Receiver apparatus in accordance with claim 18 further comprising:

means for detecting an MPCM field in a received macroblock packet, said MPCM field identifying whether the entire macroblock packet has been encoded in PCM mode; and means responsive to a detected MPCM field for detecting at least one additional -PCM field in the event that the entire macroblock packet has not been encoded in PCM mode, wherein said at least one additional -PCM field comprises an SPCM field indicative of which of PCM encoded data and DPCM encoded data are included in the video data blocks of a superblock.

20. Receiver apparatus in accordance with claim 19 wherein said means for detecting at least one additional -PCM field detect one of an LPCM and a BPCM field for each superblock having both PCM and DPCM data;

said LPCM field being present when one luminance block in the superblock is PCM encoded and all other video data blocks in said superblock are DPCM encoded, and identifying the PCM encoded luminance block; and said BPCM field being present when PCM and DPCM encoded blocks of video data occur arbitrarily in a superblock, and identifying which of the blocks of video data in the superblock are PCM encoded and which are DPCM encoded;

said receiver apparatus further comprising means for detecting a motion vector field in a received macroblock packet containing motion vector data corresponding to DPCM encoded blocks of video data.

21. Receiver apparatus in accordance with claim 18 further comprising:

means for detecting an FID field in a received macroblock packet for indicating if the macroblock packet is the first macroblock packet in a new video frame;

means responsive to a detected FID field for detecting a FILM field in a received macroblock packet that indicates, during the first macroblock packet in a new video frame, whether data in the new video frame is provided in a video mode or a film mode; and means responsive to a detected FID field for detecting a DFM field in a received macroblock packet that indicates, during the first macroblock packet in a new video frame, a frame number for the new video frame.

22. Receiver apparatus in accordance with claim 21 further comprising:

memory means for storing a film/video mode flag derived from said FILM field; and means, responsive to an indication by said film/video mode flag that a video frame in which the macroblock packet resides contains data in a video mode, for detecting an FLD field in a received macroblock packet, said FLD field indicating in which of a frame mode and field mode each of the superblocks corresponding to the received macroblock packet has been processed.

23. Receiver apparatus in accordance with claim 21 further comprising:

means responsive to a detected FID field for proceeding to receive a next successive macroblock packet after the detection of said FILM and DFM fields.

24. Receiver apparatus in accordance with claim 18 further comprising:

means for detecting a QL field in a received macroblock packet that indicates a global quantization level of said superblocks.

25. Receiver apparatus in accordance with claim 24 further comprising:

means responsive to a detected QL field for proceeding to receive a next successive macroblock packet when said QL field indicates a global quantization level that exceeds a predetermined value.

26. Receiver apparatus in accordance with claim 24 further comprising:

means for detecting a DQL field in a received macroblock packet that indicates the presence of superblocks that do not use the global quantization level; and means responsive to a detected DQL field for detecting a VQL field in a received macroblock that indicates a correction factor to be applied to said global quantization level when said DQL field indicates that the quantization level used for one or more superblocks of the current macroblock packet differ from the global quantization level.

27. Receiver apparatus in accordance with claim 18 wherein said successive video frames are divided into a plurality of subframes, each subframe containing a plurality of macroblock portions, said receiver apparatus further comprising:

means for detecting a CID field in a received macroblock packet that indicates the subframe with which the macroblock packet is associated.

28. Receiver apparatus in accordance with claim 18 wherein said macroblock packets are received within video portions of successive lines of HDTV data, said lines containing additional data including, in at least one line of each video frame, a next macroblock position (NMP) word indicative of the beginning position of the next macroblock in a data stream being received, said apparatus further comprising:

means for detecting said NMP word;

means for comparing a next macroblock position indicated by a detected NMP word to a next macroblock position indicated by DLEN data contained in a detected DLEN field, to determine if they both point to the same position in the data stream being received; and means responsive to said comparing means for resynchronizing the receiver apparatus to said data stream if the NMP word and the DLEN data fail to point to the same position.

29. Receiver apparatus for decoding variable length digital HDTV macroblock packets having a plurality of fields and being representative of macroblock portions of successive video frames divided into a plurality of subframes, each subframe containing a plurality of said macroblock portions, wherein said macroblock portions comprise a plurality of superblocks and said superblocks contain a plurality of luminance and chrominance video data blocks, comprising:

means for detecting an FID field in a received macroblock packet for indicating if the macroblock packet is the first macroblock packet in a new video frame;

means responsive to a detected FID field for detecting a FILM field in a received macroblock packet that indicates, during the first macroblock packet in a new video frame, whether data in the new video frame is provided in a video mode or a film mode;

means responsive to a detected FID field for detecting a DFM field in a received macroblock packet that indicates, during the first macroblock packet in a new video frame, a frame number for the new video frame;

means responsive to a detected FID field for proceeding to receive a next successive macroblock packet after the detection of said FILM and DFM fields;

means for detecting a CID field in a received macroblock packet that indicates the subframe with which the macroblock packet is associated;

means for detecting a QL field in a received macroblock packet that indicates a global quantization level of said superblocks;

means responsive to a detected QL field for proceeding to receive a next successive macroblock packet when said QL field indicates a global quantization level that exceeds a predetermined value;

means for detecting a DQL field in a received macroblock packet that indicates the presence of superblocks that do not use the global quantization level;

means for detecting a DLEN field in a received macroblock packet, said DLEN field identifying the length of the macroblock packet;

means for detecting an MPCM field in a received macroblock packet, said MPCM field identifying whether the entire macroblock packet has been encoded in PCM mode;

means responsive to a detected MPCM field for detecting an SPCM field indicative of which of PCM encoded data and DPCM encoded data are included in the video data blocks of a corresponding superblock;

means responsive to a detected SPCM field for detecting one of an LPCM and a BPCM field for each superblock having both PCM and DPCM data;

said LPCM field being present when one luminance block in the superblock is PCM encoded and all other video data blocks in said superblock are DPCM encoded, and identifying the PCM encoded luminance block; and said BPCM field being present when PCM and DPCM encoded blocks of video data occur arbitrarily in a superblock, and identifying which of the blocks of video data in the superblock are PCM encoded and which are DPCM encoded;

means for detecting a motion vector field containing motion vector data corresponding to DPCM encoded blocks of video data; and means for detecting variable length encoded video data in a received macroblock packet.

30. Receiver apparatus in accordance with claim 29 further comprising:

memory means for storing a film/video mode flag derived from said FILM field; and means responsive to said film/video mode flag, for detecting an FLD field in a received macroblock packet that indicates in which of a frame mode and field mode each of the superblocks corresponding to a macroblock packet has been processed, when said film/video mode flag indicates that a video frame in which the macroblock packet resides contains data in a video mode.

31. Receiver apparatus in accordance with claim 29 further comprising:

means responsive to a detected DQL field, for detecting a VQL field in a received macroblock that indicates a correction factor to be applied to said global quantization level, when said DQL field indicates that the quantization level used for one or more superblocks of the current macroblock packet differ from the global quantization level.

* * * * *